Oct. 10, 1967     R. H. ANDERSON ETAL     3,346,025
SAW CHAIN
Filed July 1, 1966
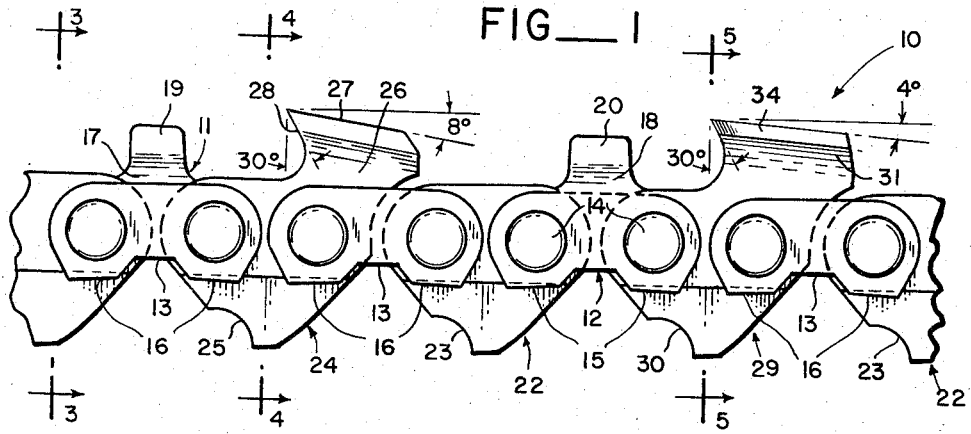
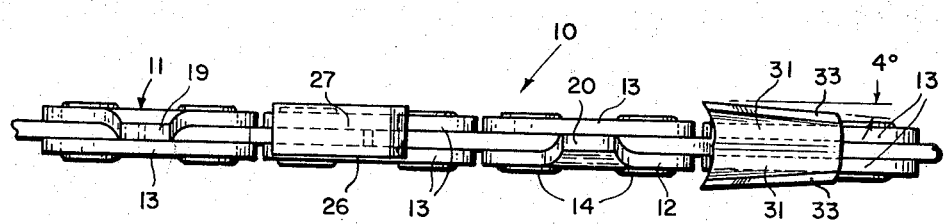
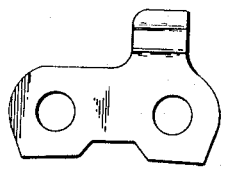
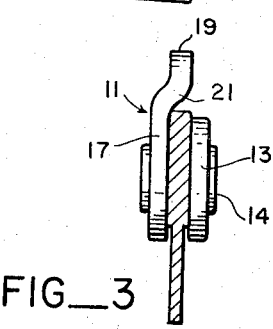
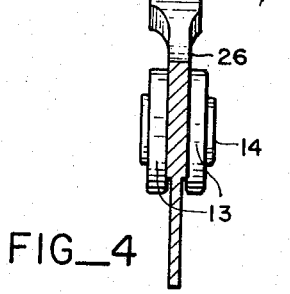
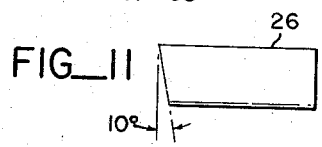
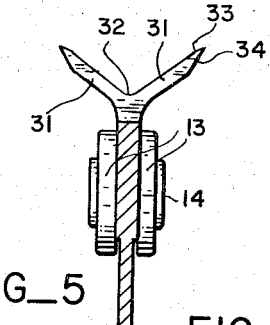
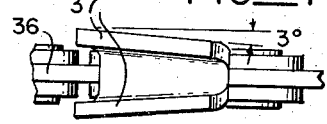
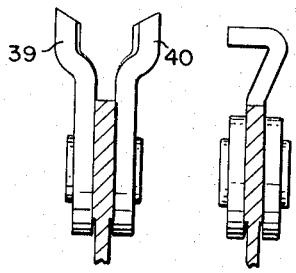
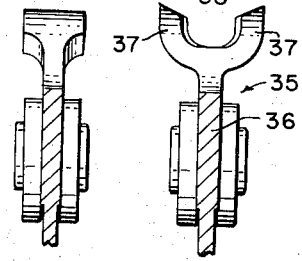
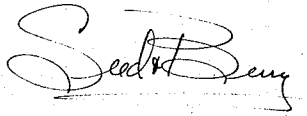
ROY H. ANDERSON
DOUGLAS J. LEMERY
*INVENTORS*
BY
*ATTORNEYS*

United States Patent Office 3,346,025
Patented Oct. 10, 1967

3,346,025
SAW CHAIN
Roy H. Anderson and Douglas J. Lemery, Victoria, British Columbia, Canada, assignors to Globe Industries, Ltd., British Columbia, Canada, a corporation
Filed July 1, 1966, Ser. No. 562,272
21 Claims. (Cl. 143—135)

This invention relates to saw chains for use on portable or stationary chain saws and more particularly to a new and improved saw chain construction and improved cutter tooth structures. This application is a continuation-in-part of our co-pending patent application Serial Number 402,694, filed October 9, 1964 now abandoned.

The revoluntionary developments of saw chain has progressed during the past twenty years from what is commonly known as a "scratcher" chain to a combination scratcher and router chain such as illustrated in the Hassler Patent No. Re. 24,129. Next came the first all-router type chain such as is illustrated in the Cox Patent No. 2,62,636. In the router chain the cutter unit simultaneously cuts both the side wall and bottom of the kerf. The chain embodies substantially identical right and left hand cutters which respectively cut the right and left side and bottom of the cutter. In the structure of the above-identified Cox patent, the routers are integral with the center drive link of the chain but the major portion of the chain sold and used today embodies a structure wherein the routers are on the side links. Such structures are illustrated in the Cox United States Patent No. 2,508,784. In each of these Cox structures there is an inherent disadvantage in that a substantial lateral course is developed, alternating first to one side and then to the other. The result is that the cutting action is inefficient and jerky and the width of the kerf is substantially increased.

One of the important features and advantages of applicants' chain is the elimination of these undesirable operating characteristics. Applicants' chain embodies a structure wherein substantially all of the lateral torque has been eliminated.

Another important feature of applicants' chain is the ease of filing for even the inexperienced filer, and the chain stays sharp longer than chains presently used.

Still a further advantage is the relationship between the depth gauges and cutting elements whereby the depth gauge more effectively performs its intended function, especially during a boring operation when the chain is passing around the curved end of the chain supporting and guiding the saw bar.

A further advantage of applicants' improved saw chain is that the chain and the cutting action or forces on the chain are balanced to the maximum extent along the longitudinal center line of the chain. This reduces the shearing forces on the rivets and the pressure and friction between the saw bar and the chain. It also reduces the tendency of the chain to "run" in the kerf.

Another advantage of applicants' new and improved chain is that the configuration and relationship of the parts makes it possible to make a narrower chain and the gauge of material may be less so that it requires a thinner bar and cuts a thinner kerf. This in turn requires less power and makes possible the use of smaller and lighter engines.

Another important advantage is the improved control of the "chip flow" and dispersion so as to eliminate clogging in the kerf and reduce power requirements.

Another advantage and improved feature of applicants' chain is that the side cutting elements sever the grain of the wood and simultaneously forms two small parallel kerfs. The wood is then removed from between the kerfs by the rakers. The cutter tooth of the present invention includes a centerlink body portion which is bifurcated so as to form the side cutting elements. With this method of cutting, a narrower rake tooth may be utilized thus allowing more room for chip flow. According to one embodiment of cutter tooth construction, the bifurcated or split portion of the tooth has a U-shaped configuration, the preferred form, however, being that of a V-shaped configuration which virtually eliminates binding within the kerf by eliminating any vertical side surfaces on the cutter tooth which contact the sides of the kerf. With the V configuration, increased chip flow also results because of the increased chip flow area and a more smooth and free running chain is provided.

All of these numerous improvements and advantages provide a straight cutting, smooth and free running chain so that the power requirements of the engine are materially reduced and faster more efficient cutting is accomplished.

In accomplishing the above mentioned and other objects of our invention, we have provided the improved details of construction, the preferred forms of which are illustrated in the accompanying drawings, wherein:

FIG. 1 is a side elevational view of a section of saw chain embodying our invention;

FIG. 2 is a top plan view thereof;

FIG. 3 is a vertical sectional view taken along line 3—3 of FIG. 1 and illustrating a front elevation of a depth gauge;

FIG. 4 is a vertical sectional view taken along lines 4—4 of FIG. 1 and illustrating a front elevation of a router or raker;

FIG. 5 is a vertical sectional view taken along lines 5—5 of FIG. 1 and illustrating a front elevation of the preferred form of cutter tooth;

FIG. 6 is a vertical sectional view illustrating a front elevation of the U-shaped cutter tooth;

FIG. 7 is a top plan view of the cutter tooth shown in FIG. 6;

FIG. 8 is a top plan view illustrating a modified form of the U-shaped cutter tooth;

FIG. 9 is a front elevational view illustrating a modifed form of the router element;

FIG. 10 is a front elevational view illustrating another modified form of the router element;

FIG. 11 is a top plan view illustrating a modified form of the router element wherein the forward cuting edge is at an angle of less than 90°; and FIG. 12 is a side elevational view of a modified form of depth gauge.

Referring more in detail to the drawings, FIGS. 1 and 2 illustrate a sequence of links designated in its entirety by the numeral 10 and it will be understood that such sequence is repeated in the same order and ararngement throughout the length of the chain. The sequence includes side links, spacer drive links and drive links which mount the cutting elements. The side links 11 and 12 perform two functions. These links, together with side links of the type designated 13 and the rivets 14, serve to join the center links in end to end, pivotal relationship. The bottom surfaces 15 and 16 of the side links 12 and 13 respectively along with the bottom surfaces of the side links 11 provide the surface for supporting the chain on the rails of the saw bar, not shown. The side links 11 and 12 are merely positioned on opposite sides of the chain and are identical and interchangable. Each of the side links 11 and 12 includes a body portion 17 and 18 respectively and a depth gauge 19 and 20 respectively. The depth gauges engage the bottom of the kerf and limit the depth of cutting of the immediately associated cutting element. The effective portion of the depth gauge is positioned along the longitudinal center line of the chain by providing an angularly bent portion, as seen at 21 in FIG. 3, so that the depth gauge overlies the adjacent center links of the chain.

The center links of the chain are of three different forms, spacer links, raker links and cutter links. The links 22 are identical and constitute the spacer links and also include sprocket engaging portions 23 which engage and are trained about the drive sprocket of the engine or power unit (not shown) for driving the chain.

The center link 24 also includes a sprocket-engaging rear portion 25 of similar configuration. These links mount or carry an integral T-shape raker 26 which extends from the body portion of the link. In plan view, as seen in FIG. 2, the top surface 27 of the raker is substantially rectangular with no rake or taper in a longitudinal direction. As indicated in FIG. 1, the top surface is downwardly inclined toward the trailing end of the link. It has been determined that an angle of approximately 8° provides excellent results but it will be appreciated that this angle may be varied depending upon the type of wood, the speed of the chain and other variable factors. The forward vertical cutting face 28 of the raker is inclined rearwardly from the top edge at an angle of approximately 30° but this angle may also be varied and is not critical. The forward face is flat and may be normal to the body portion or angled as illustrated in FIG. 11. In cutting some wood, it has been determined that a slight angle alternating in direction on each succeeding raker tooth is desirable to vary the flow or control the chips.

According to one embodiment the center link 29 is provided with a bifurcated cutter tooth with a V-shaped cross section and includes the sprocket engaging root portion 30. The V-shaped cutter tooth portion has the cutting elements 31 which form the legs of the V configuration. As illustrated in FIGS. 2 and 5, the wings or legs of the V-shaped cutter tooth are identical and in this case extend at an obtuse angle laterally from the central body portion of the link 29. The angle of spread between the legs may, of course, be varied. As seen in FIG. 1, the cutter elements 31 may be formed with a top rake or taper of approximately 4° and, as seen in FIG. 2, we provide a side rake or taper of approximately 4°. These angles are both variable as has been previously explained with reference to the other angles or degrees of rake. The apex of the angle between the legs 31 may be formed with a radius 32 to prevent the creation of a weak spot in the tooth. Each edge of each leg 31 is beveled both at the top and bottom as at 33 and 34 respectively. The beveled surfaces 33 and 34 extend the full length of the tooth. With this configuration, it will be seen that the cutter elements 31 each sever and remove a narrow chip of wood below the depth of the kerf which is then removed by the rakers. As can be seen by comparing the width of the elements in FIGS. 4 and 5, the elements 31 are spaced a distance substantially greater than the width of the rakers which merely remove the material between the parallel kerfs formed by the tips of the leading edges of the cutter elements 31. The rakers may be narrow, providing for increased chip flow, since the action required is that of merely chipping between the small side kerfs. The V configuration provides additional clearance for removal of chips on each side of the center links and substantially eliminates any vertical surface or edge which may cause binding within the kerf formed. It will also be noted that the forward tip ends of the legs 31 and the forward edge are filed or sharpened with a cutting angle and constitute cutting surfaces. The height of the side cutters may be in the neighborhood of approximately .025" greater than the height of the rakers so that preceeding side cutters will sever and remove a narrow chip of wood below the depth of the wood normally cut and removed by the following raker. The depth gauges 19 and 20, of course, limit the depth of cut which can be made by the cutters and rakers. With the V-tooth configuration of the present invention, it has been demonstrated that a marked improvement in speed and efficiency of cutting is produced and binding of the chain within the kerf is virtually eliminated. The V-tooth configuration also lends itself to modern manufacturing methods.

FIGS. 6 and 7 illustrate a modified embodiment of bifurcated cutter tooth configuration which is generally U-shaped. The cutter tooth is carried by a center link 35 which may be identical in all respects to the center link 29. The center link 35 has a body portion 36 and laterally spaced cutting elements 37 which form the cutter tooth. The side cutter elements 37 may be provided with a top rake or taper similar to that described for the tooth 29 and, as seen in FIG. 7, is provided with a side rake or taper of approximately 3°. These are both variable angles as has been previously described with reference to the cutter tooth 29. As in the case of the cutter tooth 29, the height of the side cutter elements 37 may be approximately .025" greater than the height of the rakers so that preceeding side cutter elements will sever and remove a narrow chip of wood below the depth of the wood normally cut and removed by the following raker. In this embodiment, it is preferred to have the width of the raker just slightly greater than the distance between the inside surfaces of the side cutter elements 37.

The upper portion of the side walls of the side cutter element 37 are straight and in vertical planes substantially parallel with the body portion 36. The top surfaces of the cutting elements may also be beveled as shown at 38 if desired. The forward cutting edges or surfaces may be rearwardly and downwardly inclined at approximately 30° in a manner identical to that shown in FIG. 1 for the cutter tooth 29.

The filing of the cutting surfaces of both the rakers and side cutters is accomplished with a file which is held parallel to the surface and generally normal to the direction of travel of the chain. Filing is preferably accomplished by a round or curved surface file in order to obtain a concave cutting surface as illustrated. It will be readily appreciated that such filing may be readily and satisfactorily performed by even an inexperienced filer and such filing will not normally require guides or other instruments to accomplish a satisfactory and proper filing of the cutters. If it is desired to place an angle on the rakers, such as shown in FIG. 11, this can be easily done by the inexperienced person and usually will not require a guide. In this chain construction, the height of the file in relationship to the cutting element is relatively unimportant so long as the file is held in engagement with the top cutting edge and flat against the cutting face.

The relationship between the depth gauges and the cutting elements is an important feature of our invention. We are aware that in prior art saw chains the depth gauges have been integral with the router and on center links separate from the routers. In the prior art chains with separate depth gauges, the cutting elements have normally been on the side links and the depth gauges are on the center links. In our construction we reverse this arrangement and place the depth gauge on the side links and the cutting elements on the center links. This arrangement has the inherent advantage of permitting the depth gauge to be placed closest to the cutting element and pivotally joining therewith by a common rivet. This arrangement permits articulation of the parts but retains the constant relationship between the depth gauges and the cutting edge of the cutting element especially when the chain is traveling about the round end of the saw bar. The actual height of the depth gauge in relationship to the cutting element may be varied depending upon the type of wood to be cut and the power of the engine. A normal or average difference is approximately .025" but in hardwood it may be desirable to reduce the difference to .020". We have found, however, that the differences in the hardness of the wood does not materially effect the cutting efficiency so that no alteration in the height of the depth gauge is required except in extreme cases.

In FIGS. 8, 9 and 10, modified forms of the side cutters and rakers are illustrated. FIG. 8 illustrates separate side cutter elements 39 and 40 which are formed as an integral part of the opposite side links. The modified raker of FIG. 9 has certain advantages in that it provides increased chip clearance. A raker of this shape may be filed with a round or flat file. It may also be formed by conventional stamping and forming operations and is thus cheap to produce. The T-shaped raker illustrated in FIG. 10 is similar to the raker illustrated in FIG. 4, except that it is laterally balanced on opposite sides of the center line.

In FIG. 12, we have illustrated a depth gauge wherein the wood engaging portion is moved directly over the rivet 14 and closest to the cutter element. This arrangement provides closer relationship and control between the depth gauge and the cutters and thereby makes it possible to obtain greater control of the cutters.

The advantage of the raker as shown in FIG. 4 over the raker of FIG. 10 is that it provides greater chip or sawdust clearance and reduces the friction or drag on the chain.

From the foregoing, it will be apparent to those skilled in the art that the present invention provides new and useful improvements in saw chains and cutter tooth construction and arrangement of the character described. The arrangement and types of structural details utilized within this invention may be subjected to numerous modifications well within the purview of this invention and applicant intends only to be limited to a liberal interpretation of the specification and appended claims.

Having thus described the invention, what is claimed as new and desired to be secured by Letters Patent is:

1. A saw chain comprising a plurality of pivotally joined links, means pivotally joining said links, said links being assembled in link sequences and each sequence including a plurality of side links and a plurality of center links, each of said links including a body portion, said center links including sprocket engaging root portions extending from the body portion thereof, some of said center links including a raker tooth extending from the body portion in a direction opposite said root portion, some of said center links including bifurcated cutter teeth presenting spaced side cutter elements, said teeth extending from the body portion in a direction opposite said root portion, a depth gauge formed on a side link immediately forward of each raker tooth and each cutter tooth and said depth gauge being positioned along the longitudinal center line of the chain.

2. A saw chain as in claim 1 wherein said raker tooth is of T-shaped configuration with the lateral width thereof being less than the distance between the spaced cutter elements of the bifurcated cutter teeth.

3. A saw chain comprising a plurality of pivotally joined links, means pivotally joining said links, said links being assembled in link sequences and each sequence including a plurality of side links and a plurality of center links, each of said links including a body portion, said center links including sprocket engaging root portions extending from the body portion thereof, some of said center links including a raker tooth extending from the body portion in a direction opposite said root portion, some of said center links including U-shaped side cutters extending from the body portion in a direction opposite said root portion, a depth gauge formed on a side link immediately forward of each raker tooth and each side cutter and said depth gauge being positioned along the longitudinal center line of the chain.

4. A saw chain as in claim 3 wherein said raker tooth is of T-shaped configuration.

5. A saw chain as in claim 3 wherein the depth gauge is centered intermediate the ends of the side link.

6. A saw chain as in claim 3 wherein the depth gauge is formed on the side link at the end thereof adjacent a raker tooth or side cutter.

7. A saw chain as in claim 3 wherein said raker tooth is of L-shaped configuration.

8. A saw chain as in claim 3 wherein the forward edge of said raker tooth is normal to the longitudinal center line of the chain.

9. A saw chain as in claim 3 wherein the lateral width of said raker tooth is substantially equal to the distance between the spaced cutters of said U-shaped side cutters.

10. A saw chain as in claim 3 wherein the exterior side walls of the U-shaped side cutters are substantially parallel through a major portion thereof.

11. A saw chain comprising a plurality of pivotally joined links, means pivotally joining said links, some of said links being side links and some of said links being center links, each of said links including a body portion, each of said center links including a sprocket engaging root portion extending from said body portion, some of said center links including a raker tooth extending from the body portion in a direction opposite said root portion, paired side cutter teeth spaced from said raker teeth, said paired side cutter teeth being opposed and laterally spaced to provide a generally U-shaped configuration, a depth gauge formed on a side link immediately forward of each raker tooth and each of the paired side cutter teeth and said depth gauge being positioned along the longitudinal center line of the chain.

12. A saw chain as in claim 11 wherein the paired side cutter teeth are formed on opposite side links.

13. For use in a saw chain, a center-link-mounted cutter tooth comprising; a U-shaped tooth cross section extending from the body of the link, each leg thereof forming a side cutter element with a leading cutting edge, the exterior side walls of the cutter elements being substantially parallel through a major portion thereof, the top edge of each cutter element being inclined downwardly from the leading edge forming a top and a side rake angle, and said leading edges being formed with a positive cutting edge rake angle.

14. For use in a saw chain, a center-link-mounted cutter tooth comprising; a V-shaped tooth cross section extending from the body of the link, each leg thereof forming a side cutter element with a leading cutting edge, the top edge of each leg being inclined downwardly from the leading edge forming a top and a side rake angle, and said leading edges being formed with a positive cutting edge rake angle.

15. The cutter tooth according to claim 14 wherein, a radius is formed between the legs of said tooth.

16. The cutter tooth according to claim 14 wherein, the top edge of each cutter element is beveled on both sides to form a thin edge.

17. For use in a saw chain having a reappearing sequence of pivotally connected center and side links including depth gauges, raker teeth and cutter teeth, a center-link-mounted cutter tooth comprising; first and second side cutter elements projecting laterally and upwardly from the body of said link each of said elements having an elongated body with a leading and a trailing edge and planar opposite faces, the upper longitudinal edge of each element being inclined downwardly from the leading edge to the trailing edge thereby forming the top and side rake angles, the leading edges of said elements being formed with a positive cutting edge rake angle.

18. The cutter tooth according to claim 17 wherein, a radius is formed between the inside planar faces of said cutter elements.

19. The cutter tooth according to claim 17 wherein, the upper longitudinal edge of each cutter element is beveled on both sides to form a thin edge.

20. A saw chain comprising a plurality of pivotally joined links, means pivotally joining said links, said links being assembled in link sequence and each sequence including a plurality of side links and a plurality of center links, each of said links including a body portion, said center links including sprocket engaging root portions extending from the body portion thereof, some of said center links including a raker tooth extending from the body portion in a direction opposite said root portion, some of said center links including a cutter tooth having a V-shaped tooth cross section extending from the body of the link, each leg thereof forming a side cutter element with a leading cutting edge, the top edge of each leg being inclined downwardly from the leading edge forming a top and a side rake angle, and said leading edges being formed with a positive cutting edge rake angle; a depth gauge formed on a side link immediately forward of each raker tooth and each side cutter and said depth gauge being positioned along the longitudinal center line of the chain.

21. A saw chain comprising a plurality of pivotally joined links, means pivotally joining said links, said links being assembled in link sequences and each sequence including a plurality of side links and a plurality of center links, each of said center links including a body portion with a sprocket engaging root portion extending therefrom, some of said center links including a raker tooth extending from the body portion in a direction opposite said root portion; and some of said center links including bifurcated cutter teeth extending from the body portion in a direction opposite said root portion and presenting spaced side cutter elements, the width of said raker teeth being less than the distance between the spaced cutter elements of the bifurcated cutter teeth.

References Cited

UNITED STATES PATENTS

| | | | |
|---|---|---|---|
| 1,979,001 | 10/1934 | Kankos | 143—135 |
| 2,583,243 | 1/1952 | Tweedie | 143—135 |

FOREIGN PATENTS 913,955  6/1954  Germany.

DONALD R. SCHRAN, *Primary Examiner.*